United States Patent [19]

Vinatzer

[11] 4,285,593

[45] Aug. 25, 1981

[54] CIRCUIT FOR THE CONTROL OF EXPOSURE TIME IN PHOTOGRAPHIC ENLARGING EQUIPMENT

[75] Inventor: Alex Vinatzer, Brixen, Italy

[73] Assignee: Durst AG Fabrik Fototechnischer Apparate, Bozen, Italy

[21] Appl. No.: 60,298

[22] Filed: Jul. 25, 1979

[30] Foreign Application Priority Data

Sep. 7, 1978 [IT] Italy ................... 4860 A/78

[51] Int. Cl.³ ............................................ G03B 27/80
[52] U.S. Cl. ...................................... 355/68; 355/38; 355/55
[58] Field of Search ................... 355/38, 68, 55-63, 355/35-37, 67, 69-71

[56] References Cited

U.S. PATENT DOCUMENTS

| | | | |
|---|---|---|---|
| 3,884,576 | 5/1975 | Mochimaru et al. | 355/69 |
| 4,017,180 | 4/1977 | Yen et al. | 355/69 X |
| 4,020,495 | 4/1977 | Ebner et al. | 355/68 X |
| 4,113,378 | 9/1978 | Wirtz | 355/67 X |

Primary Examiner—Donald A. Griffin
Assistant Examiner—W. J. Brady
Attorney, Agent, or Firm—Cahill, Sutton & Thomas

[57] ABSTRACT

In a circuit for the control of exposure time with photographic enlarging equipment with variable enlargement ratio, and with a device for determining light quantity, a light sensitive electric transducer is provided a fixed distance to the negative plane of the enlarging equipment. Means for generating a signal representing the enlargement ratio, in the form of a potentiometer, modifies the signal derived from the device for determining light quantity to thereby produce a signal representative of the proper change of exposure time for a selected enlargement ratio. The circuit incorporates function generators to modify the signal from the light sensitive electric transducers to allow for the correction of the failure of the reciprocity law. The light sensitive electric transducer is in the form of a photodiode, and the signal derived therefrom as a result of determining light quantity produces a charge on a capacitor which develops a signal, in one embodiment, that is compared in a comparator with the potentiometer signal.

12 Claims, 6 Drawing Figures

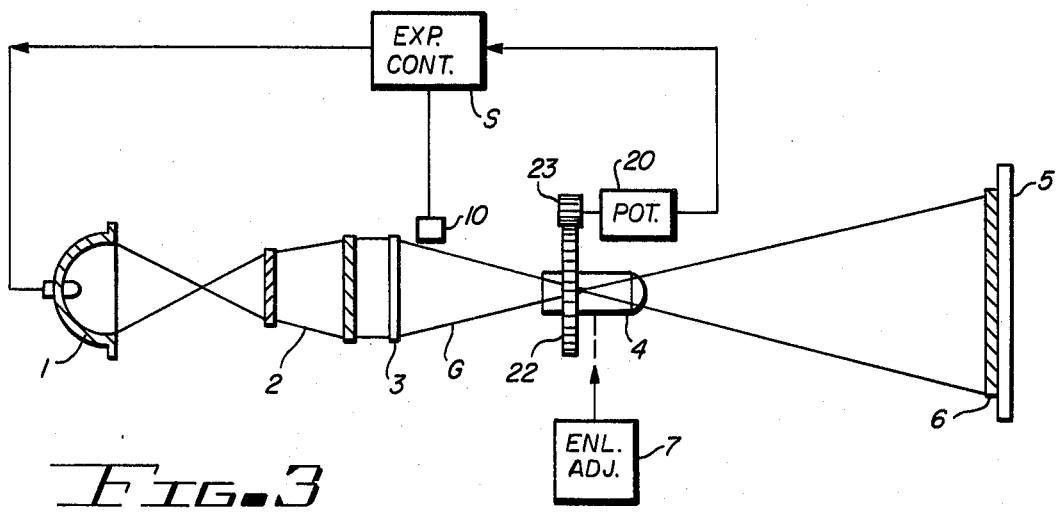
_Fig. 3_
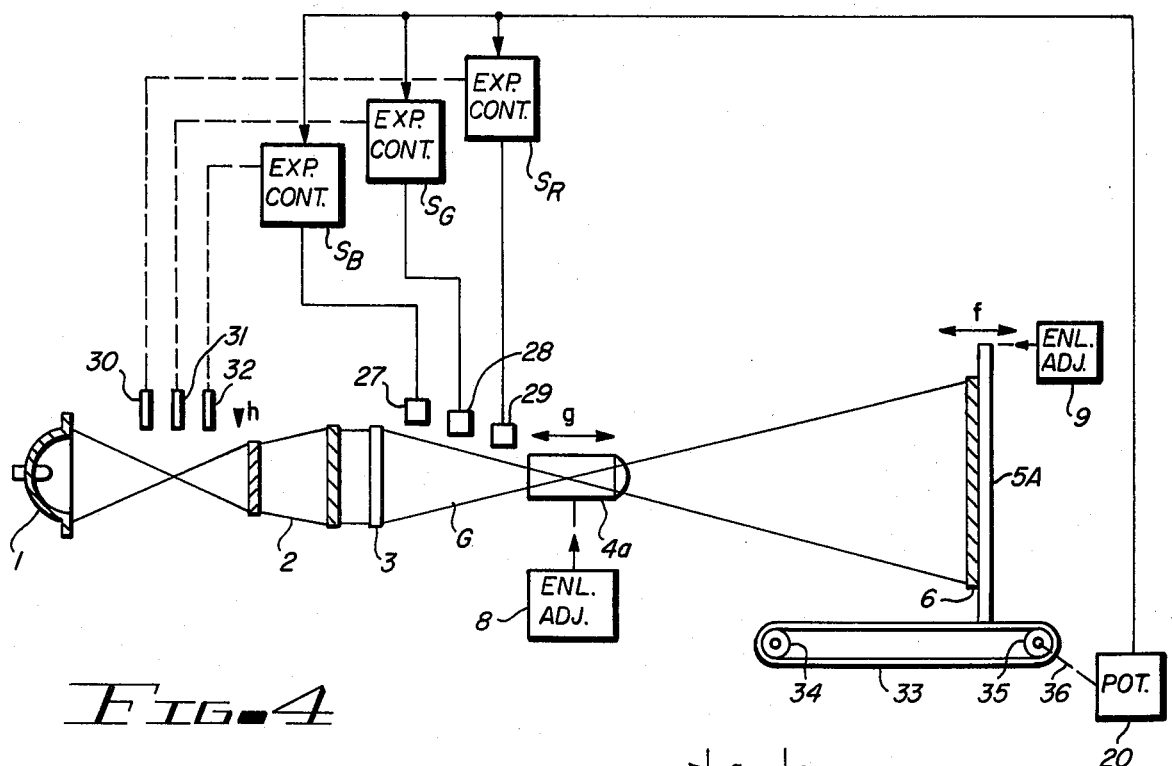
_Fig. 4_
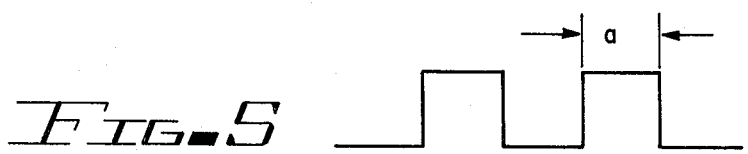
_Fig. 5_
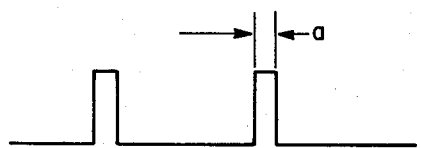
_Fig. 6_

CIRCUIT FOR THE CONTROL OF EXPOSURE TIME IN PHOTOGRAPHIC ENLARGING EQUIPMENT

The invention relates to a circuit for the control of exposure time for photographic enlarging equipment with a device for measuring the light quantity containing a light sensitive electric transducer which is arranged at a fixed distance from the negative plane of the enlarging equipment.

In well known apparatus for the control of exposure time, the applicable light sensitive electric transducers are positioned a fixed distance from the negative plane of the enlarging equipment. In this position, usually external to the illuminating beam, a light level exists that may conveniently be used for the operation of the light sensitive electric transducer. The signals available from the thus positioned transducer reach a level such that they can be easily used without the necessity of using expensive circuitry; such expense might be necessitated if the transducers were located in the copying plane. The position of the transducers near the negative plane carries no disadvantage for the greater part of enlarging equipment with automatic exposure time settings, since they are adjusted for copying pictures of a constant format (dimensions). To change the size to be exposed, objective lenses of different focal length may be used or the distance between negative and copying plane may be suitably adjusted. In both cases, it is usually necessary to reset the exposure time apparatus for the new conditions. This is usually done by adjusting a special correction circuit.

In well known enlarging equipment with automatic exposure time settings, a dial with numbered markings in different spacings is provided parallel to the direction of motion. This is done with enlarging equipment where the enlarging ratio may be changed by moving the projecting (copying) plane with respect to the negative plane. A special connection knob is part of the exposure time circuit and can be set to a multitude of positions marked with corresponding numbers. This knob controls different combinations of resistors and capacitors of an RC circuit which determines the exposure time. The operator of the enlarging equipment has to verify that the correction knob is positioned to the same numbered marking as is determined by the position of the projecting plane. The RC combination in the circuit allows for the required change of exposure time for the change in enlarging ratio. The correlation of the different parameters of the RC circuit to the different positions of the projection plane is determined empirically by the manufacturer of the equipment. This technique allows therefore only an adjustment in steps for the exposure time correction for different enlarging ratios. For all practical applications, it is then necessary to provide a minimum number of steps for all conditions and this leads to a sharp increase in cost for the equipment. Also the operation of such an enlarging equipment requires considerable time and care in reading the marking while adjusting a different enlarging ratio and resetting the correction knob; further, incorrect exposure times occur if the operator is somewhat negligent or careless in the operation of the equipment.

It is therefore an object of the present invention to provide an improved circuit for the adjustment of exposure time in photographic enlarging equipment.

It is another object of the present invention to provide a circuit for the adjustment of exposure time wherein such adjustment is continuous for different enlargement ratios.

It is yet another object of the present invention to provide a circuit for the adjustment of exposure time wherein the exposure time is continuously adjustable for different enlargement ratios and wherein no separate or additional adjustments are required to be made by the operator other than the selection of the enlargement ratio.

These and other advantages of the present invention will become apparent to those skilled in the art as the description thereof proceeds.

The present invention may more readily be described by reference to the accompanying drawings, in which:

FIG. 3 is a simplified diagram of photographic enlarging equipment, wherein the circuit of FIG. 1 or FIG. 2 may be used, with fixed projection plane and an objective with variable focal length.

FIG. 4 is a simplified diagram of photographic enlarging equipment similar to FIG. 3 wherein the projection plane may be moved with respect to the negative plane.

FIGS. 5 and 6 are illustrations of waveforms, showing variable pulse widths, useful in the description of the present invention.

Figure 1:
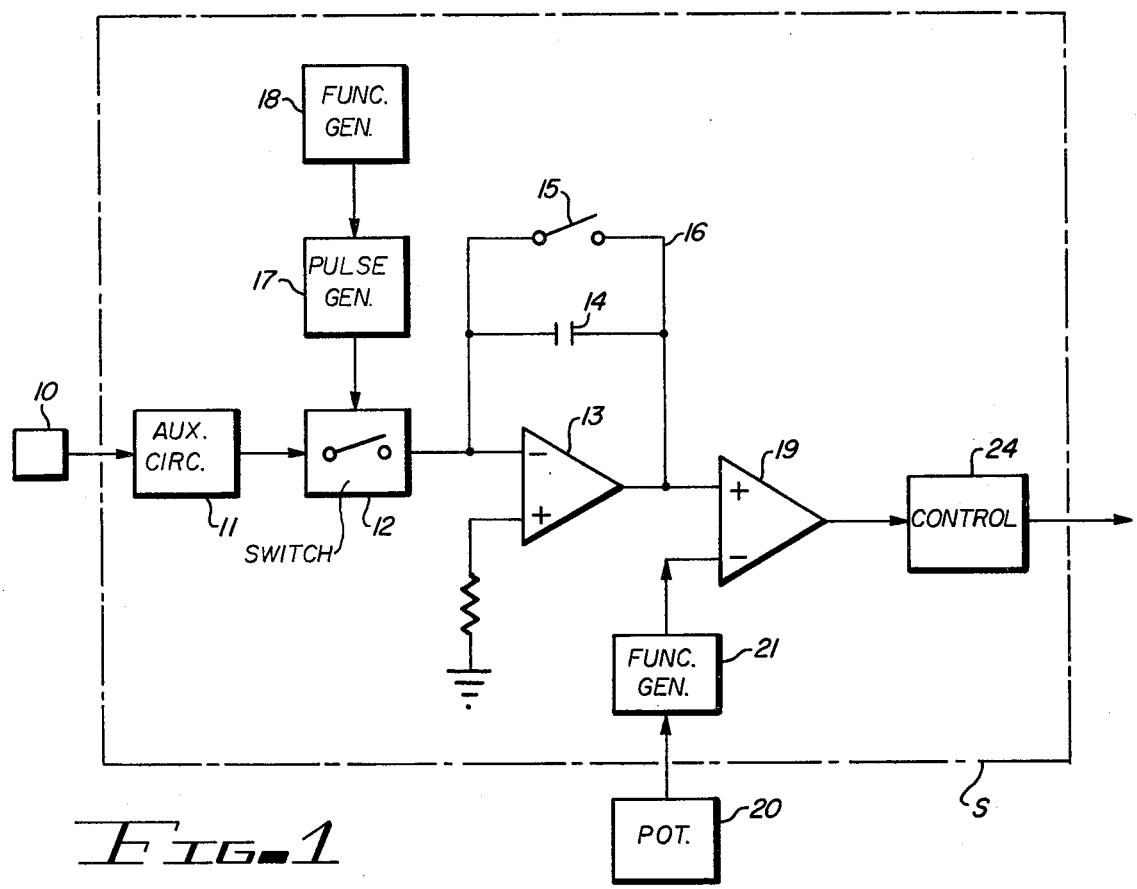
FIG. 1 is a schematic circuit diagram of a circuit constructed in accordance with the teachings of the present invention.

Referring now to the drawings, the circuit S (which will be described subsequently) is part of an exposure time control in photographic enlarging equipment with variable enlargement ratio. Enlarging equipment of this type is shown in FIGS. 3 and 4 schematically; both figures show a light source with connected reflector 1, a light tunnel 2 and a transparent picture negative 3, which is projected through an objective lens 4 or 4a, respectively, onto photographic copying material 6 which is supported by projection table 5 or 5a, respectively. Both enlarging apparatus as shown in the figures differ, however, in the method of adjusting the enlargement ratio and by details in the illuminating system. In the equipment shown in FIG. 3, the enlargement ratio is changed by an objective 4 with variable focal length while the distance of the projection table 5 from the negative plane is fixed. The focal length may be changed, for example, by rotating the objective around its optical axis using a suitable lever or other suitable mechanical or electromechanical means 7. In the enlargement equipment shown in FIG. 4, the enlargement ratio is changed by moving the projection table 5a in the direction of the arrows "f". The objective 4a with fixed focal length may be moved in the direction of the arrows "g" to obtain a focus of the projected image. The movement of the objective, and of the projection table is accomplished by the use of suitable electromechanical or mechanical apparatus 8 and 9, respectively.

To facilitate and simplify the description of the present invention, the circuit diagram of FIG. 1 will first be described in connection with its utilization in the apparatus of FIG. 3 intended for black and white enlarging. In the vicinity of the picture negative 3 to be copied, but outside of the imaging light beam G, a light-sensitive electric transducer is arranged, for example, a photodiode 10. This photodiode 10 is connected to an auxiliary circuit 11. Circuit 11 may include an amplifier for amplifying the signal from the photodiode 10 and means for alterating the amplified signal for the selection of the size of the picture negative and for calibration. This circuit connects to a periodically interrupting switch 12 and from there to the inverting input of an op-amp 13, the feedback circuit of the latter containing a capacitor 14. This capacitor may be shorted by switch 15 connected in parallel with the capacitor 14 by the conductor 16.

Switch 12 is preferably an electronic switch and is driven by a periodic signal generated in pulse generator 17.

The periodic signal is typically a rectangular signal of constant frequency and variable pulse width "a" as shown for example in FIGS. 5 and 6. This signal drives the switch in the sense that it is open for the "o" level and closed for the "L" level. Depending on the width "a" of the pulse, the current produced by photo element 10 produces a charge transfer to the capacitor 14 during each cycle. If the exposure time is to be increased above a certain minimum value to allow for compensation of the reciprocity-law failure, the pulse width of the signal from switch 12 may be decreased accordingly. For this purpose, the pulse generator 17 is connected to a function generator 18 which produces for every exposure time monotonically increasing or decreasing signals. Good results were achieved for example with a generated signal B following the relationship $B = Ce^{-\delta t}$, where t=time, C and $\delta$ are constants. C and $\delta$ may be made variable for purposes of calibration. The signal B generated in this fashion drives the pulse generator 17 in the sense that for larger values of B, the pulse width "a" is increased. Another generated signal showing good results is of the form $B' = D(1 - e^{-\gamma t})$ where t=time, D and $\gamma$ are constants. In this case, the action is reversed and smaller values of B' result in larger pulse width "a". The function generator 18 is set so that the signal B or B' respectively start with the value C or null (zero) respectively for each new exposure cycle.

The output of amplifier 13 is connected to one of the inputs of comparator 19. The other input of the comparator 19 is driven with a signal which represents, or is a function of the enlargement ratio K. This signal may be derived through various means but is typically a variable voltage taken from the moving contact of a potentiometer 20, the position of which is a measure of the enlargement ratio. This potentiometer voltage drives a second function generator 21 which is connected to the second input of comparator 19. The function generator 21 is preferably of the squaring type, in order to allow for the square of the enlargement ratio in the signal comparator 19. The enlargement ratio is determined for example by the rotary position of the objective lens system 4 of variable focal length. This lens system is fitted for example with a gear 22 which is engaged by gear wheel 23 connected to the shaft of potentiometer 20. By rotating the objective lens system 4 with its attached gear, the focal length and therefore enlargement ratio is changed and also via the described gear train the potentiometer setting is changed and a signal related to the enlargement ratio is generated. Both signals applied to comparator 19 are compared with each other. For equal signal levels, the output of the comparator 19 produces a signal which controls the light source 1 via control circuit 24.

The operation of the whole circuit is as follows: before the start of each exposure cycle, switch 15 is closed and capacitor 14 is discharged. At the start of the exposure, switch 15 is opened, while simultaneously switch 12 opens and closes periodically dependent upon the signal generated in signal generator 17. The photodiode 10 generates current, which may be amplified in a separate amplifier of auxiliary circuit 11, and charges capacitor 14 during the times when switch 12 is closed. The current produced by the photodiode is a linear function of the incident light beam. At the start of the exposure, the pulse width "a" of the driving signal for switch 12 are largest and decrease monotonically with continuing exposure, so that it is possible to allow for the failure of the reciprocity law, where picture negatives having a higher than reference density require a longer exposure time than would be required by simple reciprocity. The signal at the output of amplifier 13 increases therefore during the time of exposure and is compared with the signal indicating the enlargement ratio in the signal comparator 19. If both signals are equal, an output signal is produced which causes the copying light to be turned off via circuit 24. The copying light was turned on at the start of the exposure cycle. Instead of turning off the copying light, circuit 24 can be used to close a shutter which was opened at the start of the exposure cycle, or in a color copying system a suitable color filter may be inserted into the light beam. Function generator 18 and 21 and control circuit 24 are not described in detail since such circuits are well known to those skilled in the art.

Figure 2:
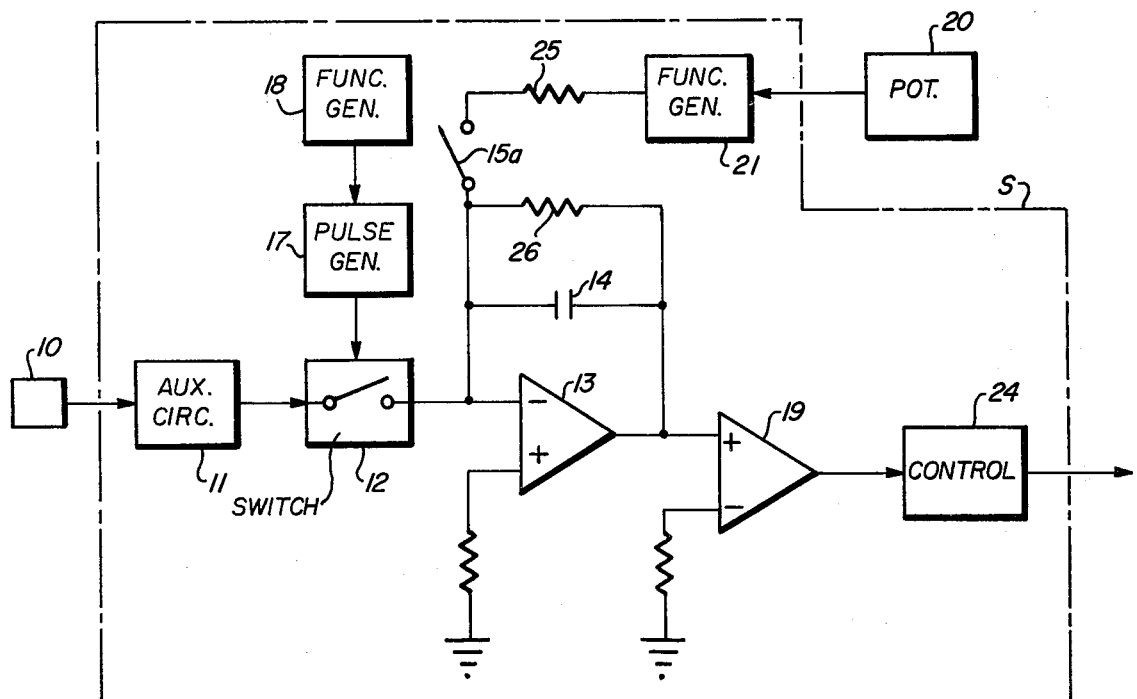
FIG. 2 is a schematic circuit of another embodiment of the circuit of the present invention.

A different circuit option is shown in FIG. 2 where the signal, representing the enlargement ratio, processed through function generator 21 is not applied to the second input of the capacitor, but rather to the input of amplifier 13 via a resistance 25 and a normally closed switch 15a which is opened at the start of the exposure. The feedback circuit of the amplifier 13 contains a capacitor 14 and a resistor 26. At the start of the exposure the capacitor begins therefore to receive a charge which is a function of the enlargement ratio. The output signal of amplifier 13 is compared in a comparator 19 with a fixed signal. The remaining details of the circuit of FIG. 2 function in the same manner as described above in reference to the circuit of FIG. 1.

The circuits described above are not only useful for the control of black and white enlarging, but may be modified in a way familiar to persons experienced in the art, for the control of color exposure. FIG. 4 shows such useage in a subtractive color exposure system; however, the circuits are also suitable for an additive system. Near the picture negative 3 and external to the copying light beam G, are arranged three light-sensitive electric transducers, e.g. photodiodes 27, 28, 29, which are sensitive to one of the three basic colors each; for example, photodiode 27 is sensitive to the blue color, photodiode 28 to green, and photodiode 29 to red. The three photodiodes are connected to a circuit SB, SG and SR, respectively. These circuits have the same design and function as already described in FIGS. 1 and 2. Each of these circuits controls the insertion depth of a subtractive color filter 30, 31, 32 into the light beam in the space between the light source 1 and the light tunnel 2.

At the start of the exposure all three color filters are outside of the light beam and are introduced into the light beam by the action of circuits SB, SG, SR as a function of the light quantity falling upon the three diodes 27, 28, 29 and the enlargement ratio. The filters are moved in the direction of arrow "h" by means not further shown. The respective filters obstruct, depending on the filter characteristics of the individual filters, a part of the light radiated from the light source. For example, the filter color of filter 30 is blue-green, that of filter 31 purple, and that of filter 32 yellow. The enlargement ratio K is represented by the position of the wiper of a rotary potentiometer 20, the output of which is applied to each of three circuits. As was mentioned earlier, the enlargement ratio K for this example is dependent on the position of the projection table 5a which is for example sensed via the belt or cord 33 and two spools 34, 34 and whereby the axis 36 of spool 35 is connected to the shaft of potentiometer 20.

It may be seen by those skilled in the art that the system used in FIG. 3 to change the enlargement ratio is also applicable to the exposure system depicted in FIG. 4 and vice versa.

I claim:

1. In a system for the control of exposure time in photographic enlarging equipment having a variable enlargement ratio, the improvement comprising: means, including light sensitive transducing means, for the generation of a first electrical signal indicating light quantity, said light sensitive transducing means positioned a fixed distance to a negative plane of the enlarging equipment; a signal generator responsive to an enlargement ratio for generating a second electrical signal which is a function of said enlargement ratio; and means responsive to said first and second signals for determining exposure time.

2. The combination set forth in claim 1 wherein said means responsive to said first and second electrical signals includes a comparator and wherein said means for generating an electrical signal indicating light quantity includes a capacitor connected to one input of said comparator, and including means connecting said second signal to a second input of said comparator wherein at a predetermined ratio of the input signals applied to the signal comparator an output signal is generated for terminating the exposure time.

3. The combination set forth in claim 1 wherein said means for generating an electrical signal indicating light quantity includes a capacitor which is connected to said signal generator for combining said first and second signals.

4. The combination of claims 1, 2 or 3 wherein said signal generator is a potentiometer.

5. The combination set forth in claims 1, 2 or 3 wherein said electrical signal proportional to said enlargement ratio is derived from the potentiometer positioned to sense the variable distance between the objective or negative plane and the projection plane of the enlarging equipment.

6. The combination set forth in claims 1, 2 or 3 wherein said electrical signal proportional to said enlargement ratio is derived from a potentiometer positioned to produce a signal dependent on the adjustment of focal length of an enlarging objective lens system with variable focal length.

7. In a system for the control of exposure time in photographic enlarging equipment having a variable enlargement ratio, the improvement comprising: means, including light sensitive transducing means, for the generation of a first electric signal indicating light quantity, said light sensitive transducing means positioned a fixed distance to a negative plane of the enlarging equipment; a signal generator responsive to an enlargement ratio for generating a second electrical signal which is a function of said enlargement ratio; means responsive to said first and second signals for determining exposure time; and said means for generating an electrical signal indicating light quantity being transmitted through a switch which alternately couples said light sensitive electric transducer to said means responsive to said first and second signals at a controllable switching rate which follows an increasing or decreasing function with time.

8. The combination set forth in claim 7 wherein said function is defined by the formula $Ce^{-\delta t}$ where $t=$ time and $C$ and $\delta$ are constants.

9. The combination set forth in claim 7 wherein said function may be defined by the formula $D(1-e^{-\gamma t})$ where $t=$ time and $D$ and $\gamma$ are constants.

10. The combination as set forth in claims 1, 2 or 3 including a function generator connected between said signal generator and said means responsive to said first and second signals.

11. The combination set forth in claim 10 wherein said function generator is of a squaring type to provide a second electrical signal proportional to the square of the enlargement ratio.

12. In a system for the control of exposure time in photographic enlarging equipment having a variable enlargement ratio, the improvement comprising: means, including light sensitive transducing means, for the generation of a first electrical signal indicating light quantity, said light sensitive transducing means positioned a fixed distance to a negative plane of the enlarging equipment; a signal generator responsive to an enlargement ratio for generating a signal proportional to said enlargement ratio; a function generator connected to said signal generator and responsive to said signal proportional to said enlargement ratio for providing a second electrical signal proportional to the square of said enlargement ratio; and means responsive to said first and second electrical signals for determining exposure time.

* * * * *